Patented May 8, 1923.

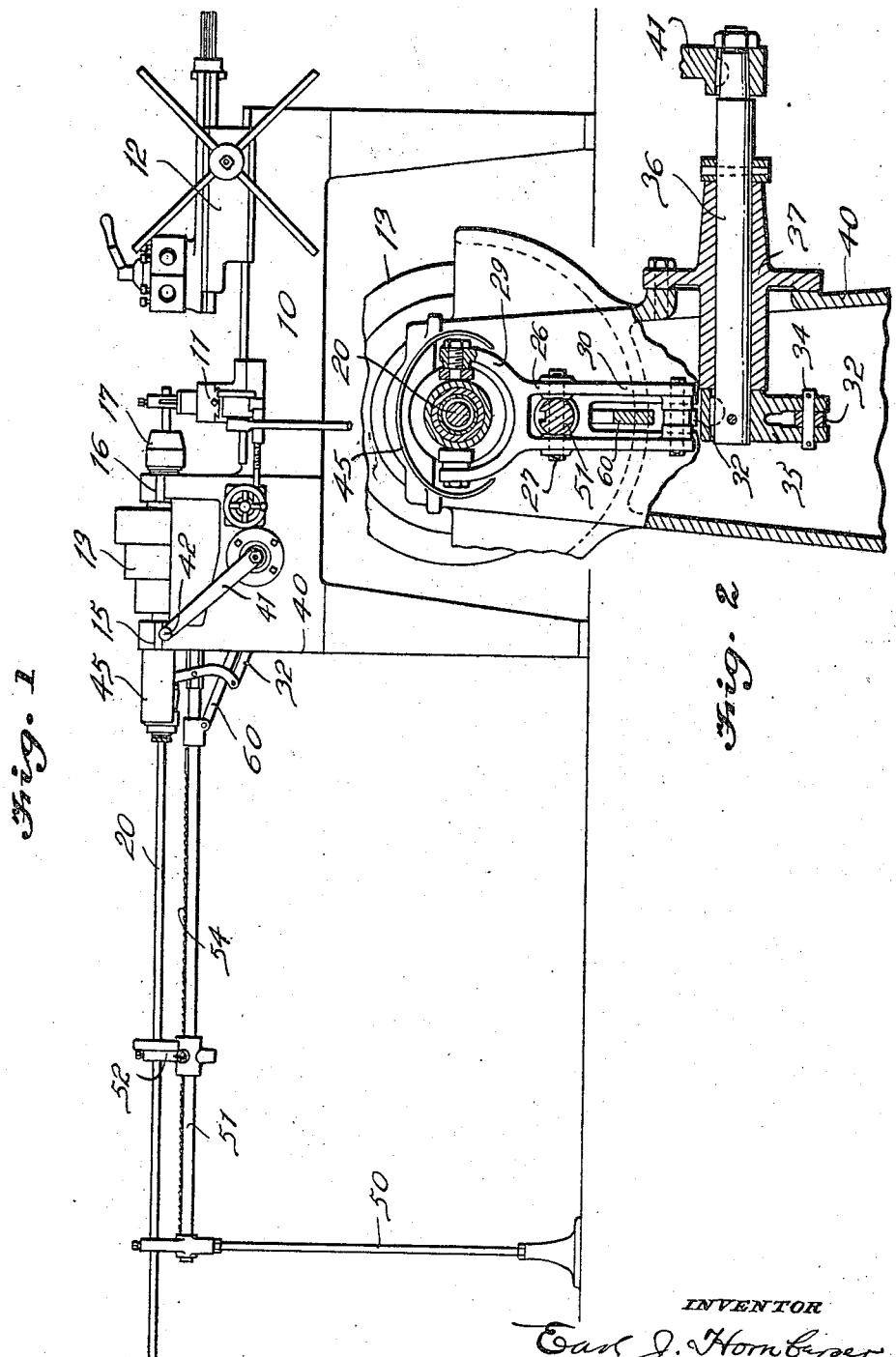

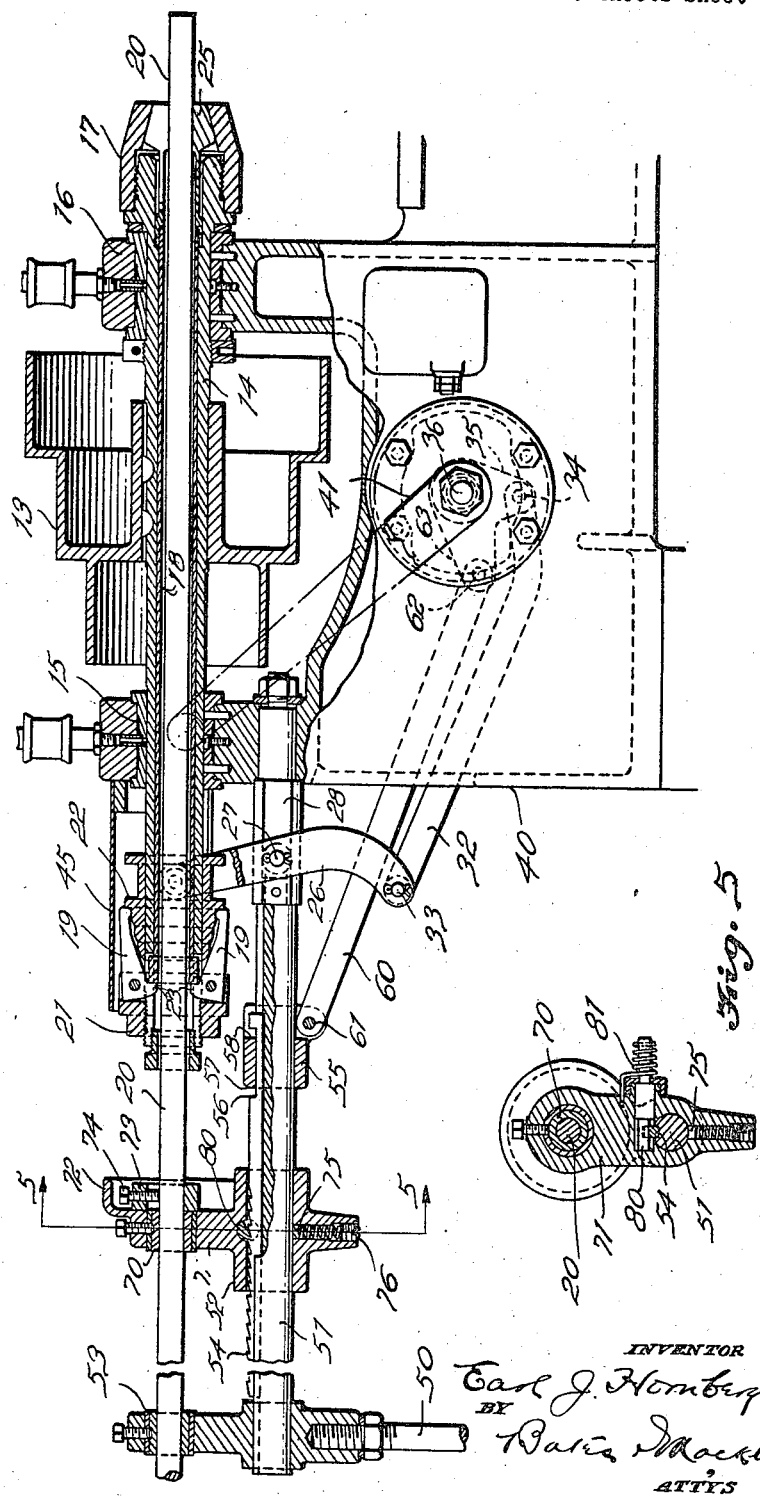

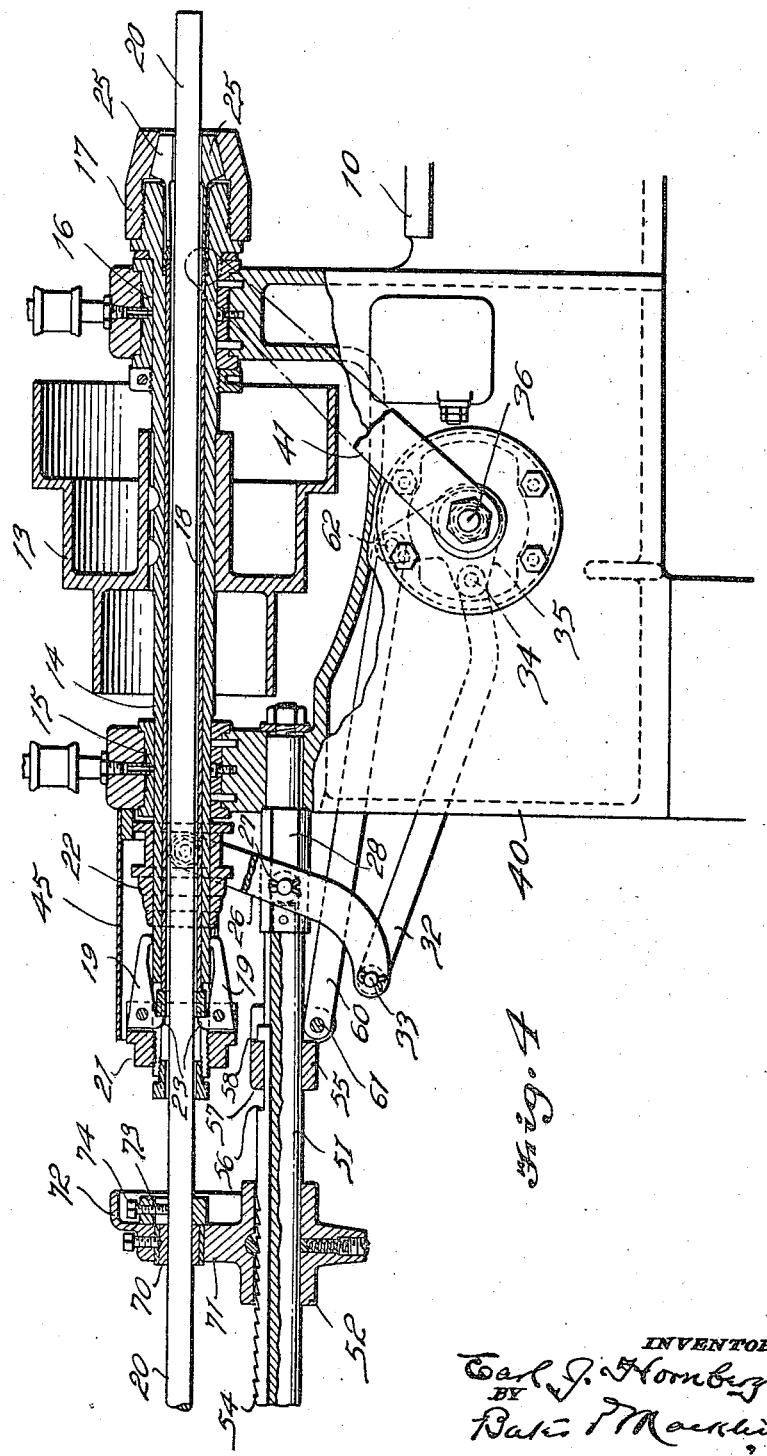

1,454,643

UNITED STATES PATENT OFFICE.

EARL J. HORNBERGER, OF CLEVELAND HEIGHTS, OHIO, ASSIGNOR TO BARDONS & OLIVER, OF CLEVELAND, OHIO, A COPARTNERSHIP CONSISTING OF GEORGE C. BARDONS AND JOHN G. OLIVER.

FEEDING AND CHUCKING MECHANISM FOR MACHINE TOOLS.

Application filed January 12, 1922. Serial No. 528,614.

*To all whom it may concern:*

Be it known that I, EARL J. HORNBERGER, a citizen of the United States, residing at Cleveland Heights, in the county of Cuyahoga and State of Ohio, have invented a certain new and useful Improvement in a Feeding and Chucking Mechanism for Machine Tools, of which the following is a full, clear, and exact description, reference being had to the accompanying drawings.

This invention relates to mechanism which is adapted for use on machines, such as engine lathes, turret lathes, milling machines and the like, wherein it is desired to advance work through a main driving spindle and thereafter to clamp it to the driving element, and wherein the work advancing and clamping operations are accomplished by a single movement of the operator's hand.

One of the objects of my invention is the provision of means for attaining successive work advancing and clamping operations so as to secure maximum power with least manual effort. In addition, my invention is directed toward the specific arrangement of the operable parts whereby the operator may easily apply the power necessary for performing the successive operations without distracting his attention from the work itself.

Another object is the provision of a simple, rugged construction which requires comparatively small space outside the body of the machine, and which embodies only a small amount of lost motion between the several working elements.

In accomplishing the above objects, I provide a single hand lever which is connected by crank arms and links with suitable mechanism for enabling the successive operations of opening the chuck, advancing the work, and then locking the chuck to be accomplished by moving the lever forwardly and rearwardly. These motions are relatively timed so that the operations are successively and automatically accomplished by a simple motion of one hand of the operator.

The means for carrying out the above objects will be more fully set forth in the following description, which relates to the drawings, and the essential characteristics of my invention will be set forth in the claims.

In the drawings, Fig. 1 is an elevation of a turret lathe embodying my invention; Fig. 2 is a transverse section taken partly through the chuck operating means and partly through the control mechanism; Figs. 3 and 4 are longitudinal sections taken through the head stock of the lathe and showing two positions of the chuck operating mechanism; and Fig. 5 is a transverse section taken on the line 5—5 in Fig. 3.

For convenience of illustration, I have shown my invention as applied to a turret lathe, but the application to any other machine would be substantially the same in relation to the work spindle. Accordingly, in the various figures, I have shown a lathe having a bed 10, a tool carriage 11 and a turret carriage 12. For the driving element I have shown a set of cone pulleys 13 which are rigidly secured to a driving spindle 14, which may be supported in the bearing blocks 15 and 16 respectively. The forward end of the spindle may be provided with an expanding jaw chuck 17, which is adapted to be actuated for clamping the work 20 by a driving plunger 18, which in turn is slidably mounted within the spindle.

The means for advancing the plunger may comprise a set of pivoted fingers 19, which are oppositely disposed within a collar 21, which in turn may be secured to the rearward end of the spindle 14. An expanding clutch comprising a cone 22, mounted on the spindle may be employed for spreading the fingers, and thereby causing the plunger-engaging portions 23 on the fingers to advance the plunger for gripping the work.

My invention then, is directly concerned with the means for reciprocating the driving plunger by a simple movement of a hand lever, which is arranged to be operable in a vertical plane, and to be accessible to an operator without endangering his hands. In addition, my invention contemplates a construction which permits the chuck operating mechanism to be installed, and used independently of the automatic feed attachment, but provides for the installation of such an attachment at a later period without changing the relative position of the parts embodied in the chuck operating mechanism. Accordingly, the means for operating the chuck will be described independently of the work advancing mechanism, and then the co-ordination, in so far as the relative timing is concerned, will be fully set forth.

In Figs. 3 and 4, I have shown the chuck operating mechanism in locked and open position respectively. Referring first to Fig. 3, which indicates the locking position, the cone is shown in engagement with the fingers 19. In this position, the plunger engaging portions 23 are in a forward position and are in abutting engagement with the rearward end of the plunger 18, whereby the jaws 25 are caused to grip the work 20.

The means for moving the cone 22 longitudinally of the spindle may comprise a lever 26, pivoted at 27, to a member 28 on the frame 40. The upper and lower portions of the member 26, as shown in Fig. 2, may be bifurcated, as at 29 and 30, to engage the cone and link 32, respectively. The link 32 is shown as having one end thereof pivoted to the yoke, at 33, and the other end at 34, to an arm 35. This arm is rigidly secured to a rock shaft 36 which in turn may be supported in a bearing 37 mounted on the side of the lathe frame 40. A hand operated lever 41, secured to the outer end of the rock shaft, and provided with a handle 42, may be employed for manually operating the rock shaft, and thereby advancing the clutch along the spindle 14. The hand lever lies in a vertical plane close to the machine and may have considerable length, thus providing the necessary power and at the same time not projecting into a dangerous position or being otherwise in the way. The advancing mechanism, as shown in Fig. 2, is almost entirely enclosed within the lathe body and within the protective casing 45 carried thereby.

The open position of the chuck is illustrated in Fig. 4 wherein the lever 41 is in a forward position and the cone is withdrawn from the fingers 19. It is to be noted that in this position the pivot point 34 on the crank arm 35 has been turned approximately a quarter of a revolution, and that such turning motion has been accomplished in a quadrant, wherein the initial movement of the shaft 36 in a clockwise direction gives substantially the maximum velocity to the pivot point 33 and consequently to the cone for withdrawing it from the fingers and thereby releasing the chuck.

Referring now to the feed mechanism for advancing the work while the chuck is open, and having reference particularly to Figs. 1 and 3, 50 indicates a standard which carries the outer bearing of a stationary member 51, which in turn supports a work advancing member 52. The standard is allowed to rest on the floor in a customary manner, and is provided with an additional work supporting bearing 53, as shown particularly in Fig. 3. The member 51 is stationarily supported by the lathe body, and for purposes of compactness I have shown such securing means as embodied in a member 28 which is also employed for supporting the yoke 26.

Slidably mounted on the member 51 I provide a rack 54, which is shorter than the distance between the standard 50 and the support 28, and is capable of longitudinal movement substantially between these two supporting points. To advance the rack, I have shown a block 55 slidably mounted on the member 51, and having a lost-motion connection with the rack bar 54, as illustrated in Fig. 3. This lost-motion connection may be attained by providing a recess 56 in which the block 55 is adapted to move; such movement being effective for actuating the rack bar only when one of the shoulders 57 and 58 engages the bar at the ends of the recess 56. A link 60 having one end thereof pivoted to the block 55 and the other end pivoted at 62 to the crank arm 63, may be employed for advancing the block along the rack. The crank arm 63 may be independent of the crank arm 35, but I have illustrated these arms as being embodied in a single casting which is rigidly secured near the inner end of the rock shaft 36.

When the chuck is in locked position, as shown in Fig. 3, then the pivot point 62 on the crank arm 63 is slightly below a plane passing horizontally through the axis of the rock shaft 36. In this position, the shoulder 57, in the block 55, is away from the rearward end of the recess 56, whereupon, as the shaft 36 is oscillated in a clockwise direction the block recedes until the lever 60 is on dead center; then as the shaft is further oscillated in a clockwise direction the block is advanced until it engages the forward end of the recess 56. Further movement of the shaft 36 in a clockwise direction advances the block and rack bar 54. As the bar 54 is advanced forwardly, the work 20 is simultaneously advanced until it strikes a limit gage, which may be held in any suitable manner in the turret.

The means for advancing the work simultaneously with the forward motion of the rack bar, is illustrated in Figs. 3 and 5 as a carrier 52, which is slidably mounted on the stationary member 51, and which is provided with a work supporting bushing 70 on the upper end thereof. The bushing is carried in a vertical extension piece 71 which may have a flange 72 overhanging the forward side to protect a collar 73, which is rigidly secured, as by an adjusting screw 74, to the work 20. The lower end of the carrier 52 may be held in frictional engagement with the support 51 by a spring operated plunger 75 held in place by a threaded member 76.

For enabling the rack bar to be moved in one direction relatively to the carrier 52, I provide an oscillatable member 80 supported transversely within the carrier 52 and above the rack bar 54. This member constitutes, in effect, a ratchet which is normally held in engagement with the rack bar by a spring 81.

When the work 20 is inserted in the spindle 14, it is first passed through the bearing 53 in the standard 50, then through the bearing 70 on the carrier 52, thence through the collar 73, and finally into the spindle to project beyond the chuck 17. The collar 73 is secured in place near the standard 50, and the carrier 52 is then brought forwardly to engage the rearward face on the collar 73. This adjustment is made after the first length to be operated on has been gauged.

The relative timing of the chuck clamping mechanism and feed mechanism, is accomplished by so arranging the crank arms 35 and 63, that the initial movement of the lever 41 in a clockwise direction, as viewed from the front of the lathe, releases the cone, thereby freeing the chuck from the work 20. During this unclamping operation, the pivot point 62 has advanced in such quadrant that slight longitudinal movement is imparted to the block 55, which controls the work feeding carrier 52. This slight motion is again increased in its range of action by virtue of the lost-motion connection between the block and the rack bar, so that there is sufficient time for the work to be entirely released from the chuck, prior to the engagement of the block with the forward face in the recess 56. The lever 41 is moved forwardly, that is, toward the tool carriage until the work strikes the limit gage, whereupon the motion is reversed so as to turn the shaft 36 in a contra-clockwise direction. As the block recedes, the first movement is employed in taking up the lost motion between the block 55 and the recess 56 and subsequent motion is then utilized for forcing the rack bar rearwardly. During the rearward motion of the rack bar, the teeth slide past the member 80 by reason of the fact that the carrier 52 is held in frictional engagement with the support 51. In this way, the work is held against the limit gage. During the rearward movement of the block and rack bar, the cone is simultaneously moved rearwardly to engage the fingers 19, and to advance the driving plunger 18 against the chuck for clamping the work accurately in position.

From the foregoing description, it will be seen that I have provided a feed advancing and clamping mechanism which requires comparatively small space outside the body of the machine and but little lost motion between the work advancing member and hand operated member. In this way, I secure a compact mechanism wherein the successive work advancing and clamping operations are attained with comparatively little effort. In addition, I attain a hand operable mechanism which is so positioned that the operator may be best able to apply power without inconvenience.

Another advantage is that machines may be sold equipped with only the chuck-operating portion of my mechanism, which is very effective in itself, and subsequently the automatic feed attachment may be supplied without changing the relative position of any of the previously installed parts. I can thus provide for installations wherein the work itself comprises separate lengths which must be inserted into the chuck from the outer end thereof, while whenever required, such installations may be converted into the more complete machine herein shown.

Having thus described my invention, I claim:

1. In a device of the character described, the combination with a frame, of work advancing means and chuck operating means carried thereby, a rock shaft mounted on the frame, two arms carried by said shaft, a link operatively connecting each arm with one of said means, the points of connection between the arms and links being so positioned that when the rock shaft is oscillated, one of said links passes through dead center position, while the other is moved beyond dead center position, said points of connection having angular velocity imparted thereto when the rock shaft is oscillated.

2. In a device of the character described, the combination with a frame, of work advancing means and chuck operating means mounted thereon, a rock shaft extending laterally through the frame, a crank arm rigid with said shaft and within the frame, a pair of links each having one end thereof connected to said arm at separated points, and the other ends thereof operatively connected to the work advancing and chuck operating means respectively, and the points of connection between the links and arm being so positioned that said points of connection move with equi-angular velocity when the rock shaft is actuated whereby the work advancing link passes through dead center, while the chuck operating link moves toward dead center.

3. In a device of the character described, the combination with a frame, of work advancing means, and chuck operating means carried thereby, a rock shaft extending laterally through the frame, a hand lever rigid with said shaft outside the frame, a crank arm rigid with said shaft within the frame, a pair of links disposed one above the other and each having one end thereof connected to the arm at separated points, and the other end thereof connected to the work advancing and chuck operating means respectively, and the points of connection between the links and arm being so positioned with reference to each other, that on initial movement of the lever in one direction, the work advancing link passes through dead center, while the chuck operating link moves toward dead center, and that when the lever is being moved near the end of its stroke. the work advancing link is moving away from dead center while the chuck operating link is passing through dead center.

4. In a device of the character described, the combination with a frame, of chuck operating means, and work advancing means carried thereby, a rock shaft extending through the frame and transversely thereof, a hand lever rigid with said shaft outside the frame, a crank arm rigid with said shaft within the frame, a pair of links disposed in the same plane and each having one end thereof connected to said arm, and the other ends thereof connected to the work advancing, and chuck operating means, respectively, the work advancing link being above the chuck operating link, and the points of connection between the links and arm being so positioned that movement of said lever in either direction, imparts relative linear velocity to the links whereby the chuck operating means is active, while the work advancing means is inactive, and vice versa.

5. In a device of the character described, the combination with a frame, of work advancing means and chuck operating means carried thereby, a rock shaft extending through the frame transversely thereof, a hand lever rigid with said shaft outside the frame, a crank arm rigid with the shaft within the frame, a pair of links disposed one above the other and in substantially the same plane, each of said links having one end thereof connected with the arm at separated points, and the other end thereof connected with the work advancing and chuck operating means, respectively, a lost motion connection between one of said links and the work advancing means, and the points of connection between the arm and links being so positioned relatively to each other, that the work advancing link passes through dead center and takes up the lost motion, while the chuck operating link moves toward the center and opens the chuck.

6. In a device of the character described, the combination with a frame, of work advancing means and chuck operating means carried thereby, a rock shaft projecting laterally through the frame, a hand lever rigidly secured to the outer end of the shaft, a pair of links each having one end thereof respectively connected to the work advancing and chuck operating means, and means for connecting the other end of said links to the rock shaft, whereby the points of connection adjacent the shaft and links move with equi-angular velocity, while the links move with different linear velocity, when the hand lever is operated.

7. In combination, a frame, a chuck carried thereby and adapted to support work passing therethrough, a rock shaft mounted on the frame, a lever connected to the shaft, a system of linkage including a link for operating the chuck, and another system of linkage including a link for advancing the work, said links lying in a vertical plane beneath the axis of the chuck, and means whereby operation of said lever imparts equi-angular velocity to said links.

8. In combination, a frame, work advancing means and chuck operating means carried thereby, a rock shaft carried by the frame, a pair of links operatively connecting the rock shaft with the work advancing means and the chuck operating means respectively, and a rock lever associated with the chuck operating means, said lever having a portion thereof straddling one of said links and operatively connected to the other of said links.

9. In combination, a frame, a chuck carried by the frame and adapted to support work passing longitudinally therethrough, a rock shaft extending transversely of the frame, a hand lever mounted on the shaft outside the frame, an arm mounted on the shaft within the frame, two links each having one end thereof pivoted to the arm at separated points, a longitudinally movable member associated with the chuck, a second longitudinally movable member associated with the work, and a lever operatively connecting one of the links with said first mentioned longitudinally movable member, said lever being formed to straddle the other of said links, and the other of said links being connected with the second longitudinally movable member.

10. In combination, a frame, a chuck carried by the frame and adapted to support work passing longitudinally therethrough, a rock shaft extending transversely of the frame, a hand lever mounted on the shaft outside the frame and operable in a vertical plane, an arm mounted on the shaft within the frame, two links one disposed above the other and each having one end thereof pivoted to the arm at separated points, a longitudinally movable member for operating the chuck, a second longitudinally movable member for advancing the work, a lever bifurcated at both ends and connecting the lower link with the chuck operating member, said bifurcated lever being formed to straddle the upper link, and said links being so positioned on the arm that movement of the hand lever in one direction opens the chuck, and advances the work, while movement of said hand lever in the opposite direction retains the work in the advanced position and clamps the chuck thereto.

11. In combination, a frame, a chuck carried by the frame and adapted to support work passing longitudinally therethrough, a rock shaft extending transversely of the frame, a hand lever mounted outside the frame, an arm rigid with the shaft and inside the frame, two links, one disposed above the other and each having one end thereof pivoted to the arm, means for operatively connecting the upper link to the chuck, means for operatively connecting the lower link to the work, said links being so positioned on said arm that movement of the hand lever in one direction moves the point of connection between the arm and the lower link longitudinally of the links, and simultaneously moves the point of connection between the arm and the upper link transversely of the links.

12. In combination, a frame, a chuck carried thereby and adapted to support work passing longitudinally therethrough, a rock shaft extending transversely of the frame, a hand lever rigidly secured at one end of the rock shaft, an arm rigidly secured to the other end of the rock shaft, two links, one disposed directly above the other and each having one end thereof connected at separated points to the arm, means for connecting the free end of one of said links to a chuck, and means including a lost motion connection for operatively connecting the free end of the other of said links to the work.

In testimony whereof, I hereunto affix my signature.

EARL J. HORNBERGER.